(12) United States Patent
Hartwig-Biglau et al.

(10) Patent No.: US 10,766,096 B2
(45) Date of Patent: Sep. 8, 2020

(54) ELEMENT SUPPLY DEVICE OF A SETTING WELDING DEVICE

(71) Applicant: BÖLLHOFF VERBINDUNGSTECHNIK GmbH, Bielefeld (DE)

(72) Inventors: Sergej Hartwig-Biglau, Löhne (DE); Konstantin Schmidt, Bad Salzuflen (DE)

(73) Assignee: Böllhoff Verbindungstechnik GmbH, Bielefeld (DE)

(*) Notice: Subject to any disclaimer, the term of this patent is extended or adjusted under 35 U.S.C. 154(b) by 79 days.

(21) Appl. No.: 15/417,290

(22) Filed: Jan. 27, 2017

(65) Prior Publication Data

US 2017/0216957 A1    Aug. 3, 2017

(30) Foreign Application Priority Data

Jan. 28, 2016   (DE) .................. 10 2016 101 557
Feb. 1, 2016    (DE) .................. 10 2016 101 755

(51) Int. Cl.
  *B23K 11/30*   (2006.01)
  *B23K 11/10*   (2006.01)
  (Continued)

(52) U.S. Cl.
  CPC .............. *B23K 11/30* (2013.01); *B21J 15/32* (2013.01); *B23K 11/0053* (2013.01);
  (Continued)

(58) Field of Classification Search
  CPC ......... B23K 11/30; B23K 11/10; B23K 11/11; B23K 11/3009; B23K 20/129;
  (Continued)

(56) References Cited

U.S. PATENT DOCUMENTS

| | | | |
|---|---|---|---|
| 1,333,414 A | 3/1920 | Havener | |
| 5,105,060 A * | 4/1992 | Tanaka | B23K 11/36 219/78.01 |

(Continued)

FOREIGN PATENT DOCUMENTS

| | | |
|---|---|---|
| DE | 954187 C | 12/1956 |
| DE | 4318908 C1 | 8/1994 |

(Continued)

OTHER PUBLICATIONS

EP Partial Search Report for EP Application No. 17152927.4 dated Sep. 1, 2017, 8 pages.

(Continued)

*Primary Examiner* — Tu B Hoang
*Assistant Examiner* — Alba T Rosario-Aponte
(74) *Attorney, Agent, or Firm* — Reising Ehington P.C.

(57) ABSTRACT

The present invention describes an element supply device of a setting welding device for a bolt-like welding auxiliary joining part with head and shaft. This element supply device comprises two scissor-like arranged clamping jaw levers which define a blind hole channel with a nest-like end position for receiving the welding auxiliary joining part. Further, the element supply device comprises a first actuator and a second actuator by means of which the nest-like end position can be positioned suitably with respect to an electrode punch.

15 Claims, 11 Drawing Sheets

Figure 1:
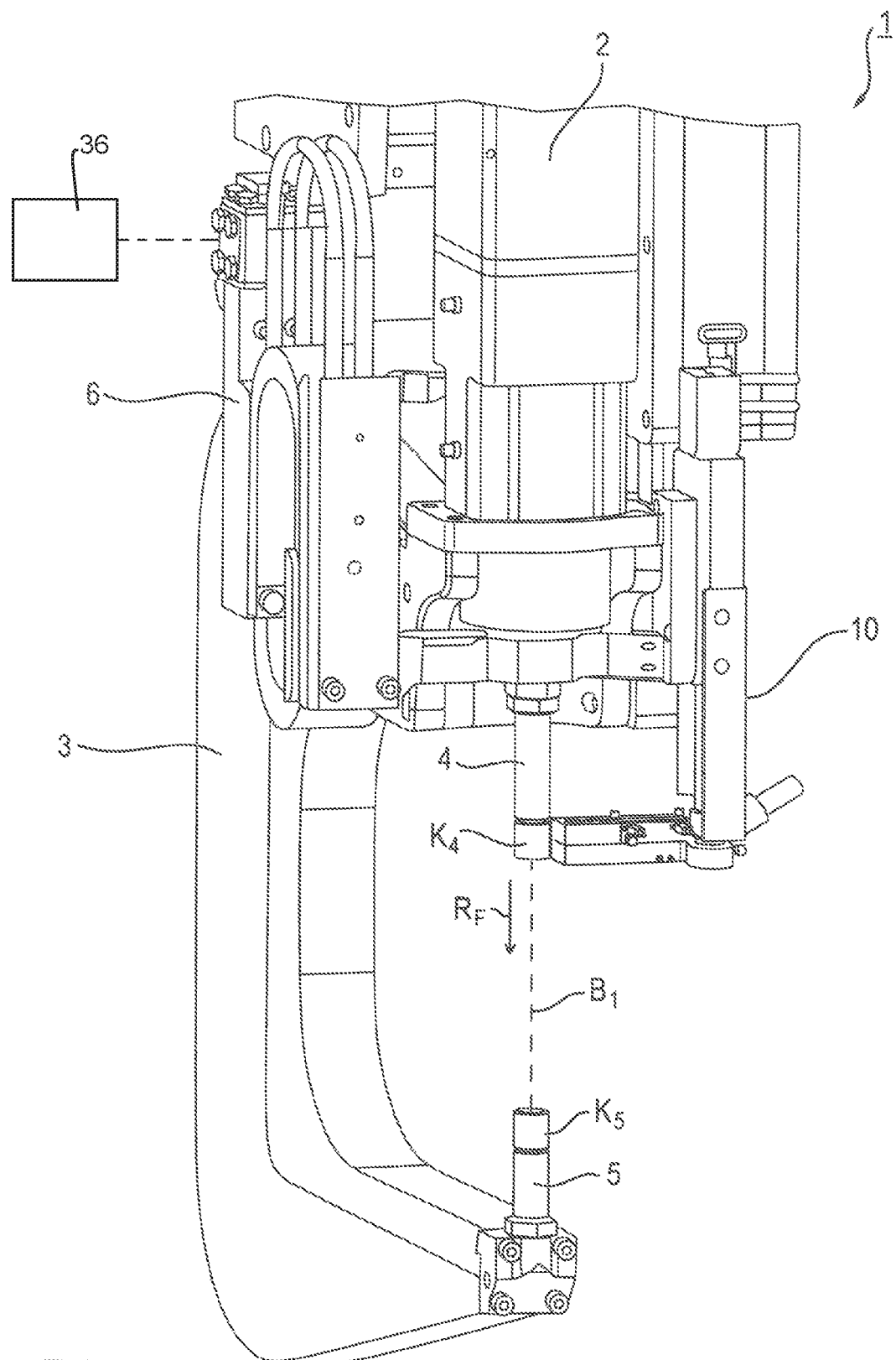

(51) Int. Cl.
  *B23K 11/00*  (2006.01)
  *B21J 15/32*  (2006.01)
  *B23P 19/00*  (2006.01)
(52) U.S. Cl.
  CPC .......... *B23K 11/0066* (2013.01); *B23K 11/10* (2013.01); *B23P 19/006* (2013.01)
(58) Field of Classification Search
  CPC ............. B23K 20/1295; B23K 11/115; B23K 11/0435; B21J 15/08
  USPC .... 219/78.16, 78.01, 98, 86.1, 86.33, 86.41, 219/60 A, 124, 101, 161; 269/275, 288
  See application file for complete search history.

(56) References Cited

U.S. PATENT DOCUMENTS

| | | | |
|---|---|---|---|
| 5,492,262 | A | 2/1996 | Pascarelli |
| 2009/0260413 | A1 | 10/2009 | Tomchick |
| 2013/0042471 | A1 | 2/2013 | Kikuchi |
| 2013/0153544 | A1* | 6/2013 | Goto ..................... B23K 11/115 219/117.1 |
| 2015/0165544 | A1* | 6/2015 | Molina Mesa ...... B23K 11/315 219/86.33 |
| 2016/0354872 | A1* | 12/2016 | Koscielski ............ B23K 11/115 |
| 2017/0072454 | A1* | 3/2017 | Wilcox .................... B21J 15/32 |

FOREIGN PATENT DOCUMENTS

| | | | | |
|---|---|---|---|---|
| DE | 102004039398 | A1 | | 2/2006 |
| DE | 102009024433 | A1 | | 12/2010 |
| DE | 102010060141 | A1 | | 4/2012 |
| DE | 102013207284 | A1 | * 10/2014 | ......... B23K 11/0053 |
| EP | 0678360 | A1 | | 10/1995 |
| EP | 2671662 | A1 | | 12/2013 |
| JP | 61235082 | A | * 10/1986 | |
| JP | S62212078 | A | | 9/1987 |
| JP | H07228337 | A | | 8/1995 |
| JP | H09239553 | A | | 9/1997 |
| JP | H10225774 | A | | 8/1998 |
| JP | 2002018650 | A | | 1/2002 |
| JP | 2002321064 | A | | 11/2002 |
| JP | 2007000930 | A | | 1/2007 |
| JP | 2007167947 | A | | 7/2007 |
| JP | 2008168336 | A | | 7/2008 |
| JP | 2013066978 | A | | 4/2013 |
| WO | WO2016000077 | A1 | | 1/2016 |

OTHER PUBLICATIONS

CN Office Action for CN Application No. 201710063180.1 dated Sep. 29, 2018, 11 pages.
JP Office Action for JP Application No. 2017-013709 dated Feb. 27, 2018, 7 pages.
CN Office Action for CN Application No. 201710063180.1 dated Apr. 29, 2019, 5 pages.
JP Decision to Grant for JP Application No. 2017-13709 dated Dec. 18, 2018, 6 pages.

* cited by examiner

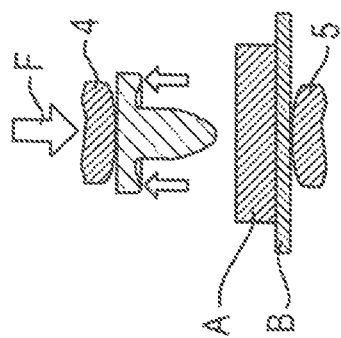 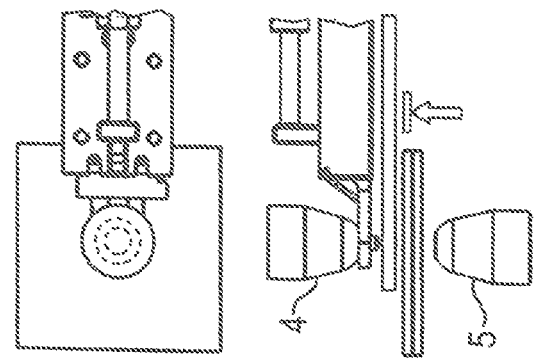
FIG. 6.1
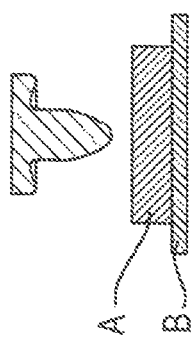 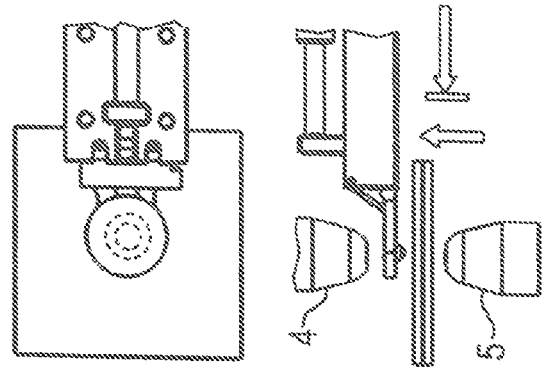
FIG. 6.2
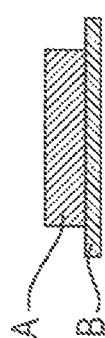 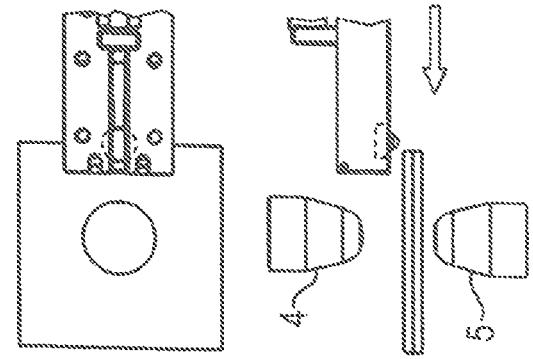
FIG. 6.3

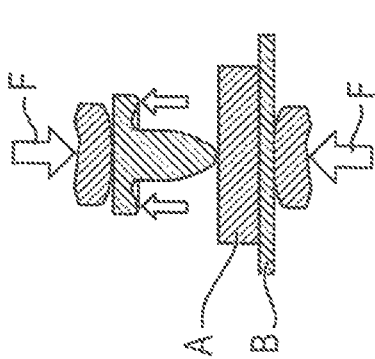 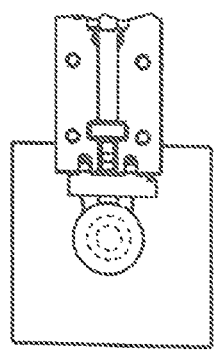 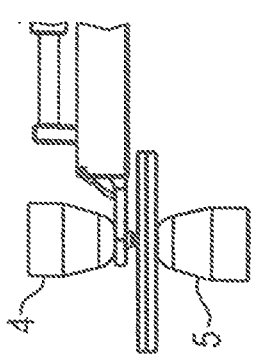
FIG. 6.4
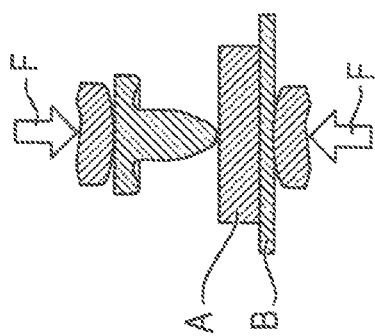 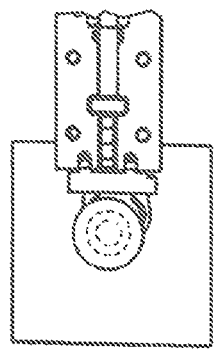 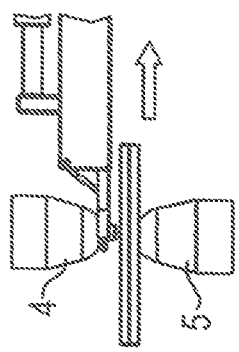
FIG. 6.5
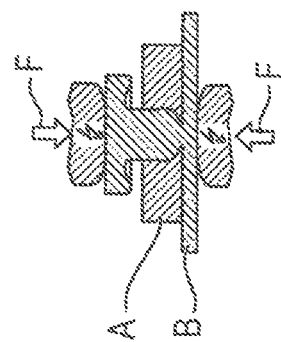 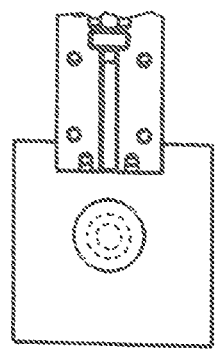 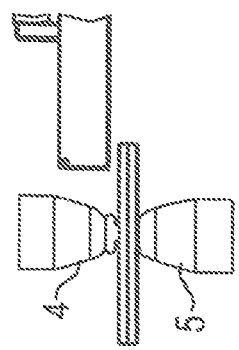
FIG. 6.6

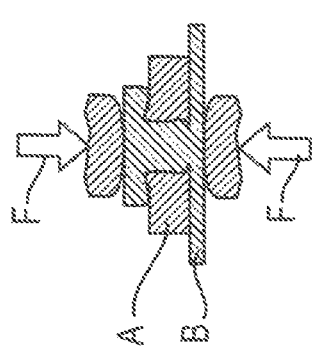 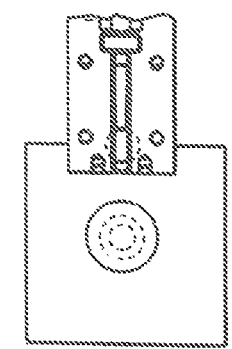 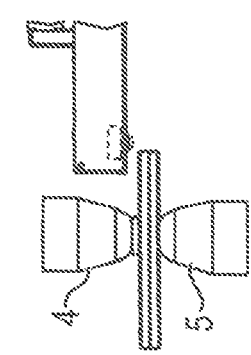
FIG. 6.7
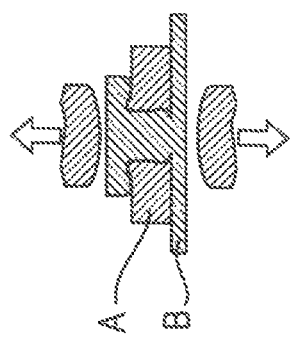 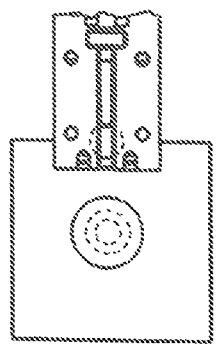 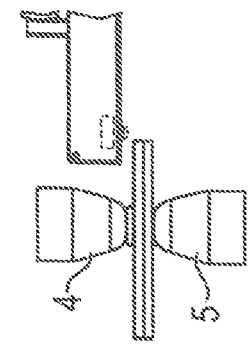
FIG. 6.8
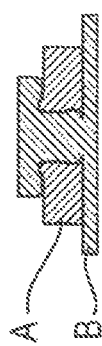 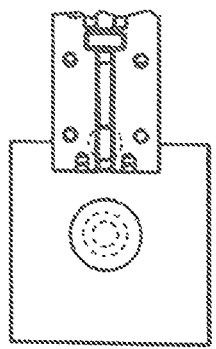 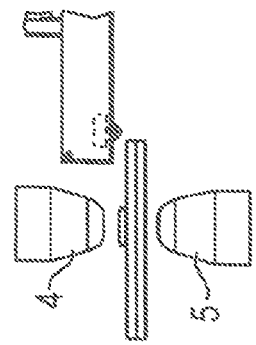
FIG. 6.9

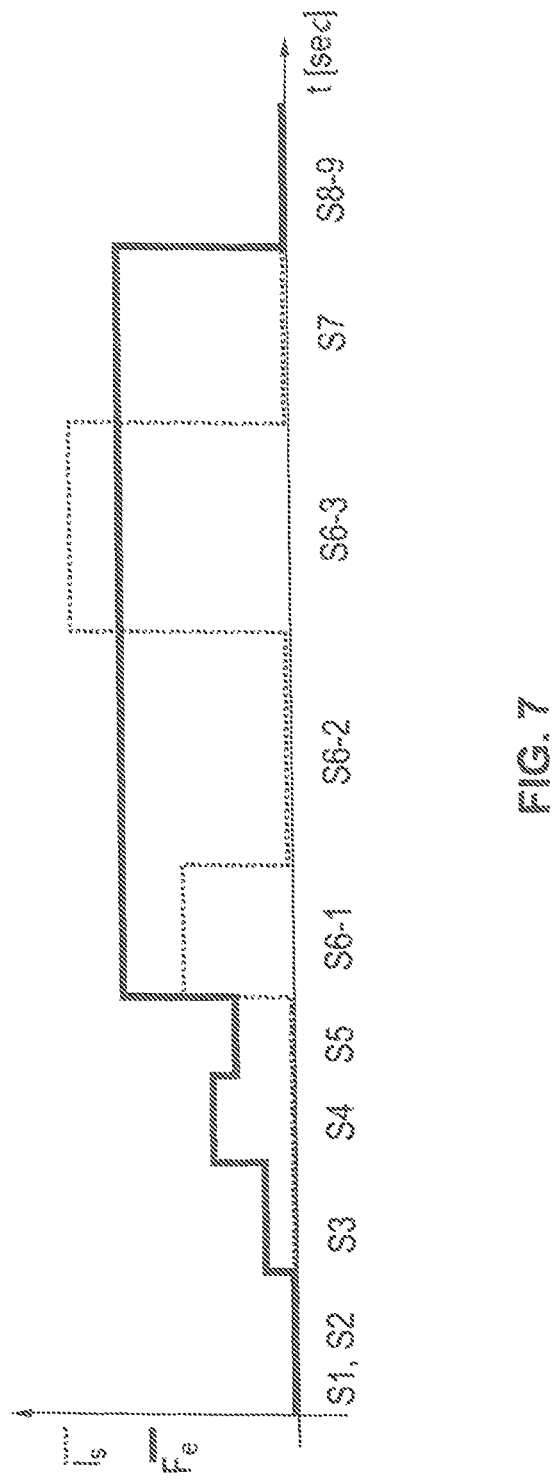

ELEMENT SUPPLY DEVICE OF A SETTING WELDING DEVICE

1. CROSS REFERENCE TO RELATED APPLICATIONS

This application claims priority to German Patent Application No. DE 10 2016 101 557.1 filed Jan. 28, 2016 and German Patent Application No. DE 10 2016 101 755.8 filed Feb. 1, 2016. The content of these priority applications is incorporated herein by reference in its entirety.

2. TECHNICAL FIELD

The present disclosure is related to an element supply device of a setting welding device for a bolt-like welding auxiliary joining part having a head and a shaft, in which a relative joining movement can be performed by an electrode punch and an electrode counter bearing for producing a setting welding connection. Further, the present disclosure is related to a respective setting welding device as well as a connection method in the form of a mechanical thermal setting welding process by means of the above-mentioned bolt-like welding auxiliary joining part and the setting welding device.

3. BACKGROUND

In the prior art, different connection methods processing auxiliary joining parts are known. Among these connection methods are pure mechanical connection methods as for example the punch riveting or bolt setting. At such devices, the joining element is supplied to the joining channel of the setting device for example via a profiled tube or another element supply arrangement operated with pressurized air. Within the joining channel, the punch of the setting device moves on a straight movement line as part of a joining movement toward for example a die to produce a connection.

A similar pure mechanical joining method is realized by a nailing device to which a plurality of nails is supplied automatically. For this, according to U.S. Pat. No. 5,492,262, a nail strip wound up within a magazine is unwound within a supply device to transfer individual nails to the joining device. As these nails are connected to each other first of all by means of the nail strip, especially the separation of the nails is complex and cannot automatically be transferred to other joining methods.

DE 10 2010 060 141 A1 describes the positioning and supplying of auxiliary joining parts to a friction welding device. The supply device for the friction welding elements provides a clamping jaw arrangement forming the end of a supply channel for friction welding elements. The end position of the supply channel is arranged directly below the rotating punch of the friction welding device. An axially movable adjusting element having different thickness portions with respect to the length of the actuation element is arranged between the two clamping jaws such that an axial displacement of the actuation element causes a different wide opening of the clamping jaws. Correspondingly, a thickness portion of the actuation element and thus a specific distance of the clamping jaws is assigned to the supply of a friction welding element while a larger thickness portion of the actuation element and thus a wider opening of the clamping jaws is provided so that the rotating punch, upon passing through the two clamping jaws, takes up the joining element positioned there and supplies it to a joining position.

Due to the combination of the lateral movable clamping jaws and the axially displaceable actuation element in direct adjacency of the rotating punch, this is a complex and space-consuming construction which is adapted especially to the supply of pure mechanical torque loads to a joining element.

At other friction welding devices, it is, however, advantageous to supply the friction welding elements directly to a joining channel of the friction welding device. This is described in DE 10 2004 039 398 A1.

At resistance welding other constructions are realized compared to the above-described supply constructions and supply principles of the joining elements because here, besides mechanical loads, also electrical loads are applied to the joining element. For example, DE 43 18 908 C1 describes an indirect supply of the welding auxiliary joining parts to the joining location. These welding auxiliary joining parts are first of all supplied to a pivotable transfer device by means of a supply channel. This transfer device retains the welding auxiliary joining parts by means of a magnet. Then, a combined linear movement for removing the welding auxiliary joining part from the supply channel and a pivoting movement of a lever arm takes place with this welding auxiliary joining part. This movement positions the welding auxiliary joining part below the one welding electrode of the welding device. Before the effective welding takes place, the welding auxiliary joining part is arranged within the welding electrode by means of a retaining device.

This ensures that already prior to the beginning of the welding process the lever arm and, thus, the supply device can be removed from the electrodes of the welding device. As the welding auxiliary joining part is clamped solely into the electrode, this results in inaccuracies in the positioning of the welding auxiliary joining part at the joining location. Further, the here used supply device is also complex in its construction due to the different movements to be performed and the coordination with respect to each other.

DE 10 2013 207 284 A1 describes a setting welding device by means of which a welding auxiliary joining part is set into at least two components under combined mechanical and electrical loads. Here, the advantageous discovery is used that the electrical loads known from resistance welding methods can support a mechanical joining process which further realizes a welding process coordinated with the mechanical joining process. Similar to the known setting devices, a welding auxiliary joining part is here supplied into the joining channel below the punch. While the welding auxiliary joining part is held there in an intermediate position, the punch of the welding setting device moves the welding auxiliary joining part toward the components to be joined to each other. This type of element supply does not always ensure a sufficiently accurate positioning of the welding auxiliary joining part at the components to be joined to each other. This may lead to disadvantages at the connection quality and/or the connection strength.

It is thus an object of at least certain implementations of the present invention to provide a setting welding device as well as an element supply device for such a setting welding device by means of which a setting welding process can be improved, especially compared to the prior art and the device can be realized in a simpler and more cost-effective way. This applies with respect to a possible accuracy of the supply of welding auxiliary joining parts as well as with respect to the positioning of the welding auxiliary joining parts for the preparation of the connecting of the at least two components. Accordingly, at least some implementations of the present invention may also provide an improved connection method by means of a setting welding device.

4. SUMMARY

At least some of the above objects may be achieved by an element supply device, and a setting welding device. Developments and preferred embodiments of the present invention result from the following description, the accompanying drawings as well as the appending claims.

The element supply device of a setting welding device for a bolt-like welding auxiliary joining part having a head and a shaft, in which a relative joining movement along a first straight movement line can be performed by an electrode punch and electrode counter bearing for producing a setting welding connection, has the following features: two scissor-like arranged clamping jaw levers, at least one clamping jaw lever of which is arranged pivotably and both clamping jaw levers form together a blind hole channel which can be closed temporarily on one side having a nest-like end position, in which a welding auxiliary joining part can be received at the end position, a first actuator by means of which the blind hole channel can be moved along another than the first movement line so that the nest-like end position of the blind hole channel is positionable between the electrode punch and the electrode counter bearing, and a second actuator by means of which the blind hole channel can be moved parallel to the first movement line in a force- and/or distance-controlled manner so that a welding auxiliary joining part held at the nest-like end position of the blind hole channel can be positioned in a force fit abutting at the electrode punch.

The element supply device is realizable as integral part of a setting welding device or as modular component. Such a modular component can be combined with known setting devices, welding devices or setting welding devices and is thus retrofittable. This element supply device is characterized in that welding auxiliary joining parts can be supplied individually to the setting welding device first of all by means of the defined blind hole channel with nest-like end position. Thus, the element supply device provides not only individual welding auxiliary joining parts for the connection method but it also separates these welding auxiliary joining parts prior to the connecting of at least two components. Besides the blind hole channel with the nest-like end position, the element supply device is provided with two different actuators which place the nest-like end position and thus the welding auxiliary joining part in a desired arrangement between a punch and a counter bearing of the setting welding device. Preferably, the punch and the counter bearing of the setting welding device are provided as electrode punch and electrode counter bearing to be able to create individually or in combination mechanical and electrical loads in the joining area during the connecting of the at least two components by means of the welding auxiliary joining part. The two actuators of the element supply device make it possible that individual welding auxiliary joining parts arranged in the nest-like end position can be arranged specifically adjacent to the punch or the counter bearing or in an intermediate position between punch and counter bearing and can be held there. According to a preferred embodiment of the present invention, a force fit of the welding auxiliary joining part is created and maintained at the punch. Force fit in this context means that the welding auxiliary joining part is in contact with the punch or abuts there such that possible intermediate spaces or a possible clearance between punch and welding auxiliary joining part are avoided. To this end, the welding auxiliary joining part is preferably moved into abutment with the punch until a predetermined force is achieved. Subsequently, the predetermined force acting between punch and welding auxiliary joining part is maintained until the punch pre-tensions the material layers against the counter bearing by means of the welding auxiliary joining part, as it is explained in detail below. Further, the two or also only a chosen one of these actuators make a specific movement of the welding auxiliary joining part in the nest-like end position together with the punch or with the combination of punch and counter bearing of the setting welding device possible. To be able to perform this specific positioning of the welding auxiliary joining part preferably adjacent to the punch or the counter bearing in a controlled manner, the distance covered by the end position and/or the force acting on the end position and thus on the welding auxiliary joining part due to the abutment of the welding auxiliary joining part at the punch or at the counter bearing can be specifically captured and evaluated. To this end, preferably the captured distance and/or force data is transmitted to a control unit of the element supply device or to a common control unit of element supply device and setting welding device or to the control units of the element supply device and the setting welding device. Based on this additional information, the connection method (see below) and the element supply are coordinated.

According to a preferred embodiment of the element supply device, the first actuator comprises a linear actuator by means of which the end position of the blind hole channel can be moved linearly perpendicular to the first movement line. To be able to connect at least two components with each other by means of the setting welding device, the electrode punch and the electrode counter bearing are moved relative to each other in a joining movement along the first straight movement line. For producing the connection, it may be necessary in at least certain applications that a welding auxiliary joining part to be supplied is specifically positioned along this first straight movement line between the electrode punch and the electrode counter bearing. This ensures that the mechanical or electrical loads to be applied by the electrode punch and the electrode counter bearing can be introduced optimally into the welding auxiliary joining part.

Therefore, preferably the element supply device comprises two actuators of which one actuator realizes a movement along the first movement line and the second actuator a linear movement perpendicular to the first movement line. On this basis, the welding auxiliary joining part can be arranged at arbitrary positions between electrode punch and electrode counter bearing and can be integrated into the joining movement of electrode punch and electrode counter bearing at a selected time. This ensures also that the welding auxiliary joining part can be arranged specifically abutting the electrode punch or the components positioned on the electrode counter bearing. This specific arrangement, which can be realized preferably force- and/or distance-controlled, makes a connection method possible without the usage of a down-holder or preclamping device for fixing the components. This has the positive result, respectively, that the setting welding device in combination with the preferred element supply device can be constructed without down-holder and thus in a simpler way. Further, the control concepts related to the down-holder are preferably dispensable if the connection method is realized based on the usage of the element supply device. It is optionally also conceivable to use the down-holder in combination with the element supply device.

According to a further preferred embodiment of the present element supply device, the blind hole channel comprises a detent 32 (shown in FIG. 5) which is pivotable and can be overcome or is conquerable by a welding auxiliary joining part only in the direction of the end position. This preferably lever-like formed detent is conquerable by a welding auxiliary joining part sliding into the blind hole channel, while this detent prevents a movement of the welding auxiliary joining part out of the blind hole channel. The detent may be formed preferably lever-like. This lever has a longitudinal extension which is arranged parallel to the course of the blind hole channel. For realizing the above-summarized functions, the detent comprises a center of rotation at the end facing away from the end position.

According to a further preferred embodiment of the element supply device, the clamping jaw levers of the blind hole channel are formed groove-like at an inner side so that a head of the welding auxiliary joining part can be guided therein and can be held movable therein in a form-fit manner. This form-fit between head of the welding auxiliary joining part and the blind hole channel ensures that the welding auxiliary joining part cannot fall out of the blind hole channel even in an overhead operation of the setting welding device or of the element supply device, respectively.

A further preferred embodiment of the present invention provides that the element supply device comprises a control unit by means of which captured operating data of the element supply device can be evaluated and at least one command for at least one connected component, preferably a central control of a setting welding device, can be created and transmitted thereto. First of all, the control unit ensures that the element supply device can be used modularly and can be operated independently. To this end, the control unit preferably monitors the own operating mode and specifies the next steps of the element supply device based on the evaluated data. Further preferred, the control unit is designed such that it cooperates with a central control of the setting welding device. This can be realized in that the control unit as master component (see below) specifies for the central control of the setting welding device working as slave component if and/or when and/or which next step has to be performed by the setting welding device. Thus, preferably the control of the element supply device evaluates whether the welding auxiliary joining part is mechanically pre-tensioned sufficiently between punch and counter bearing. If it has also captured that the element supply device has been removed from the welding auxiliary joining part, it allows the central control or enables for it to start the setting movement of the welding auxiliary joining part by the punch. Further, it is preferred that the control unit specifies for the central control when and/or how fast a punch movement or similar step has to be performed.

The present disclosure comprises further a setting welding device for a welding auxiliary joining part comprising an electrode punch and an electrode counter bearing by means of which a relative joining movement can be performed along a first straight movement line to produce a setting welding connection and which comprises an element supply device according to the above-described embodiments of the present invention.

Such a setting welding device is described in DE 10 2013 207 284 A1 which is hereby incorporated by reference into the present application. This setting welding device is characterized in that a welding auxiliary joining part is connectable to at least two components under mechanical and electrical loads individually or combined. This setting welding device thus realizes a combination of a known mechanical joining method and a resistance welding method to connect at least a first and a second material layer with each other. In this context, the bolt-like welding auxiliary joining part is set into the at least one first material layer and deformed at the second material layer of electrically conducting material or at an electrically conducting portion of the second material layer mechanically/thermally and connected to it in the contact portion in a material-fit manner by a welding process. It is also preferred that the welding auxiliary joining part in the first material layer is set under usage of combined mechanical and electrical loads.

With respect to the material design of the material layers to be connected to each other as well as to the combination of electrical and mechanical loads at the usage of the setting welding device, it is also referred to DE 10 2013 207 284 in which these details are disclosed extensively. These details are applicable to the here-described setting welding device and the usage of the setting welding device in the same way. Accordingly, the setting welding device comprises the already above-described punch and the counter bearing arranged oppositely to the punch. The punch and the counter bearing may create mechanical as well as electrical loads in the welding auxiliary joining part in that they are provided as electrode punch and electrode counter bearing. The movement of the punch and thus the force applied to the welding auxiliary joining part is created by a drive. This drive is realized according to different preferred embodiments of the setting welding device pneumatically, electrically or hydraulically. Further, the drive is controlled or driven by means of a control and/or regulating device.

The adjustable electrical currents supplied to the punch and the counter bearing serve on the one hand for performing the welding process (see below). Preferably, the bolt-like welding auxiliary joining part is welded areally to the second material layer of weldable material or to sections of weldable material in this material layer. This welding, which is not preceded by a setting of the welding auxiliary joining part into this second material layer, takes place at the surface of the second material layer preferably by means of an electrical resistance welding. To this end, preferably the electrode punch is connected with a negative electric potential and the electrode counter bearing is connected with a positive electrical potential in the setting welding device to support a welding process (see below). As an alternative to this, it is also preferred to arrange the element supply device at the plus electrode of the setting welding device. With respect to the setting welding device, a positive electrical potential is thus present at the punch. Further, the supplied electrical currents preferably serve for a heating of the welding auxiliary joining part and adjacent portions of the material layers to be connected to each other. Accordingly, the setting welding device is used as heating device to create specifically heating electrical currents at least in the welding auxiliary joining part.

According to a further preferred embodiment of the present invention, the element supply device is fastened at the setting welding device such that it is movable together with the punch during a punch movement. This means that the element supply device is preferably fastened at the punch itself. According to a further embodiment, the element supply device is fastened at a construction element of the setting welding device which is moved together with the punch by the drive of the welding setting device. This construction ensures that preferably the element supply device has to hold a welding auxiliary joining part, which is positioned suitably at the punch, only in its position while the punch is moved in the direction of the counter bearing. Thus, no coordinated movements of the drive of the punch and the actuators of the element supply device are necessary.

It is further preferred to provide the setting welding device with a central control which exchanges data and/or commands preferably as slave component with a control unit of the element supply device configured as master component.

The present disclosure comprises further a connection method in the form of a mechanical thermal setting welding process by means of the bolt-like welding auxiliary joining part for at least one first material layer without pre-punching of the at least one first material layer to at least one second material layer of weldable material or having a section of weldable material. This connection method comprises the following steps: positioning of the at least one first and the at least one second material layer between an electrode punch and an electrode counter bearing, which are adapted to perform a relative joining movement along a first straight movement line, positing the welding auxiliary joining part between the electrode punch and the electrode counter bearing, moving the welding auxiliary joining part into abutment with the electrode punch in a force-controlled and/or distance-controlled manner, collectively moving of electrode punch and welding auxiliary joining part subsequently to the preceding step until abutment at the material layers which are supported at the electrode counter bearing, and thereby mechanical pre-tensioning of the material layers and connecting of the welding auxiliary joining part and the material layers by means of mechanical and thermal loads.

The mechanical thermal connection method is optimized by the specific positioning of the welding auxiliary joining part between the electrode punch and the electrode counter bearing. In particular, especially the force-controlled and/or distance-controlled moving of the welding auxiliary joining part arranged within the nest-like end position of the blind hole channel in abutment with the electrode punch realizes a new starting position for the connection method as generally known from the prior art. Because this abutment of the welding auxiliary joining part at the electrode punch first of all ensures an accurate positioning between electrode punch and welding auxiliary joining part. By means of the preferred subsequent collective movement of the welding auxiliary joining part and the electrode punch in preferably permanent abutment at each other, this defined combination is further combinable with the material layers to be connected and the counter bearing. This combination of electrode punch and welding auxiliary joining part first of all excludes a setting process between electrode punch and welding auxiliary joining part. Further, a mechanical load of the electrode punch is directly transferred via the welding auxiliary joining part to the material layers which are supported at the counter bearing. Thus, this collective movement of electrode punch and welding auxiliary joining part provides a preferred pre-tensioning of the material layers at the counter bearing. While the element supply device ensures the stable position of the welding auxiliary joining part in abutment with the electrode punch, the combined movement of electrode punch and welding auxiliary joining part realizes the functionality of a down-holder by pre-tensioning the material layers at the counter bearing. Accordingly, due to the element supply device, a down-holder in the setting welding device is dispensable.

According to a further preferred embodiment of the connection method, the welding auxiliary joining part is held in force-fit (see above), preferably with at least a predetermined force, in abutment at the electrode punch. Further, preferably, as already mentioned above, the material layers are pretensioned without down-holder.

According to the present disclosure, it is also preferred to release the welding auxiliary joining part by the element supply device after the welding auxiliary joining part and the material layers between the electrode punch and the electrode counter bearing have been pre-tensioned. If the welding auxiliary joining part is supplied without a down-holder or into a surrounding supply channel, first of all a fixation of the welding auxiliary joining part may be necessary by a mechanical pretension of the electrode punch onto the welding auxiliary joining part and from this to the electrode counter bearing via the material layers to be connected. Only then, the welding auxiliary joining part is in a defined and secured position between electrode punch and electrode counter bearing so that the element supply device can release the welding auxiliary joining part.

According to a further preferred embodiment of the connection method, a force applied by the welding auxiliary joining part onto the electrode punch is captured by means of a force-sensor and/or a distance covered by means of an element supply device of the welding auxiliary joining part toward the electrode punch is captured. These captured data, which are preferably processed by a control unit of the element supply device or by a control unit of the setting welding device or by a combined control unit of both systems, form the basis for a defined positioning of the welding auxiliary joining part. In this context, preferably the control of the element supply device (master) and the central control of the setting welding device (slave) are interconnected in a master-slave combination. This means that the control of the element supply device monitors the defined positioning of the welding auxiliary joining part between electrode punch and electrode counter bearing. As soon as the control unit of the element supply device confirms a correct positioning of the welding auxiliary joining part to the central control of the setting welding device, the specific connecting of the at least two material layers is started by the setting welding device. In this respect, preferably the control unit of the element supply device functions as master while the control unit of the setting welding device follows these pre-settings. It is also preferred that the above-described process is monitored by only one control, thus a common control for the setting welding device and the element supply device.

Further preferred, the connection method may comprise the further steps: transmitting the captured force and/or the captured distance to a control unit and starting of an advancing of the welding auxiliary joining part with the electrode punch in the direction of the electrode counter bearing after reaching a predetermined force and/or a predetermined distance. In a further preferred embodiment of this procedure, the captured force and/or the captured distance is transmitted to the control unit of the element supply device which functions preferably as master control. After evaluating the received data and of a probably positive internal confirmation of their validity, the control unit of the element supply device allows the central control of the setting welding device, which is preferably functioning as a slave, to continue with the connection method. It is also preferred that the control of the element supply device presets for the central control to continue the connection method with a specific step. Further, it is preferred that the following steps are performed: pressing in and welding of the welding auxiliary joining part in the material layers, preferably compressing and bracing of the connection of material layers and welding auxiliary joining part by applying a force with the electrode punch, and releasing the electrode punch and the electrode counter bearing from the connected material layers.

5. BRIEF DESCRIPTION OF THE ACCOMPANYING DRAWINGS

Figure 2:
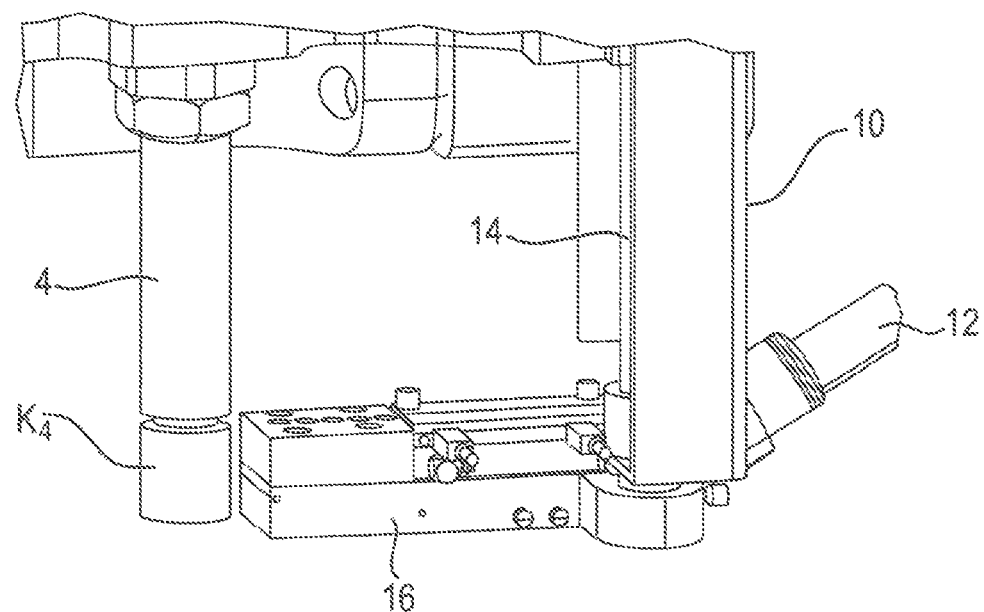
Figure 3:
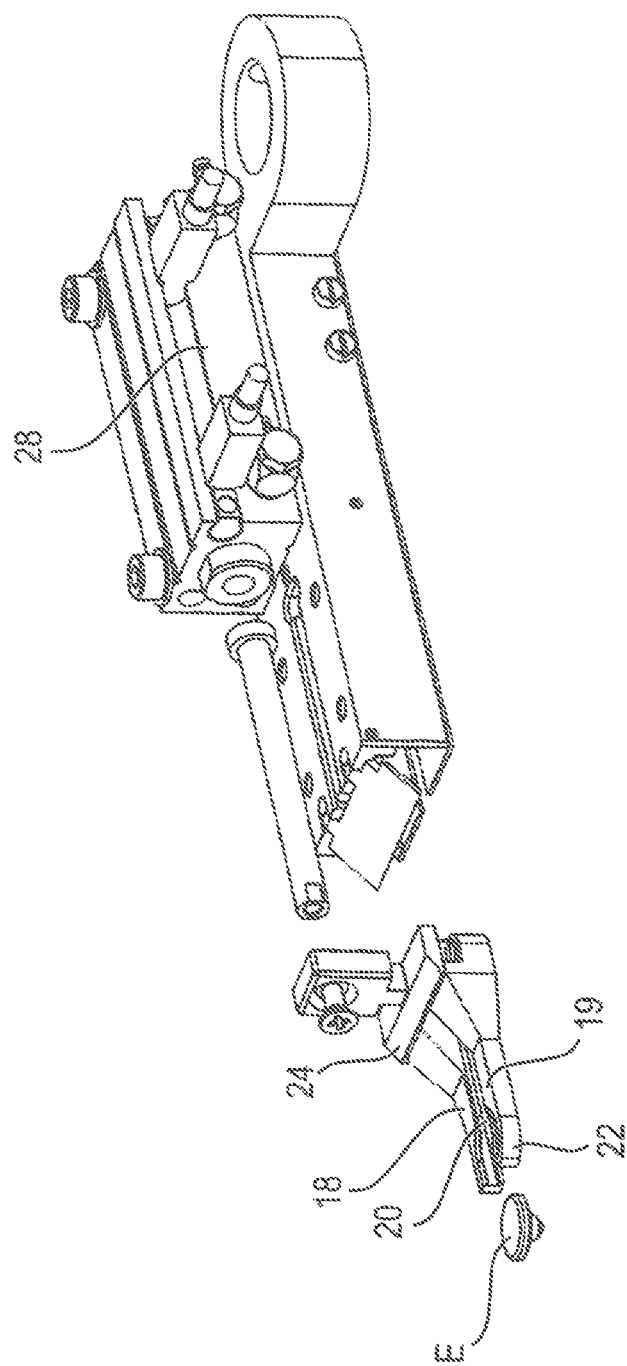
Figure 4:
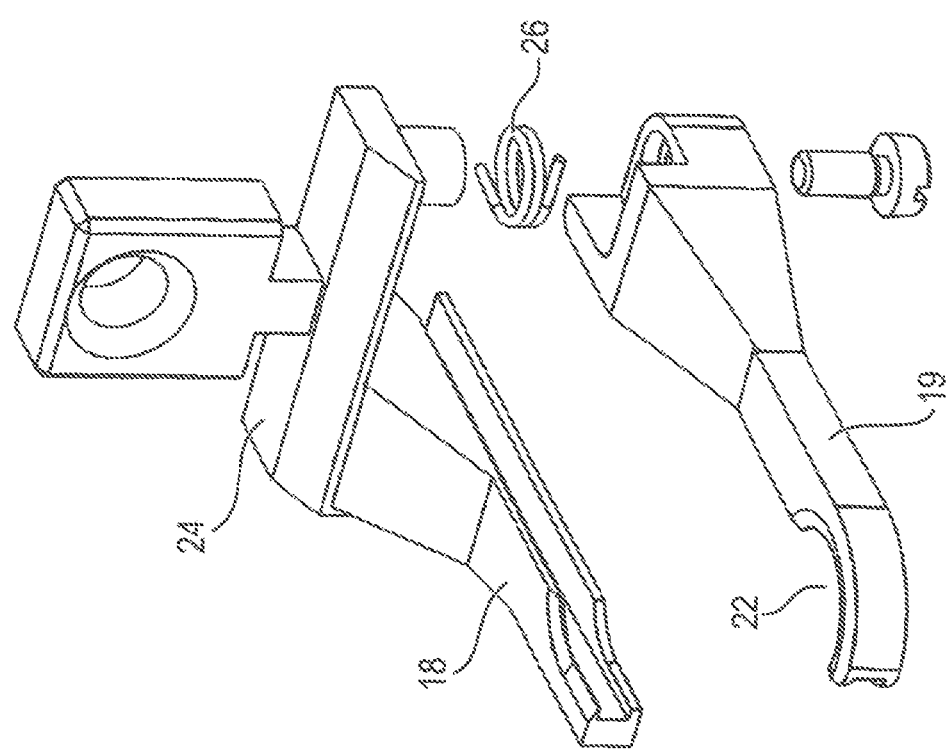
Figure 5:
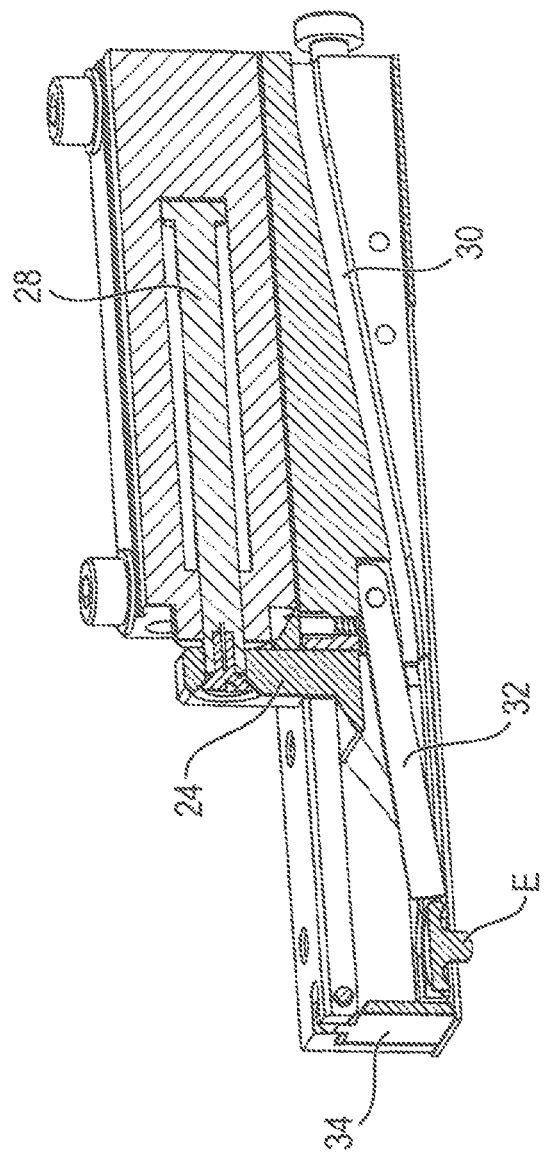
Figure 8:
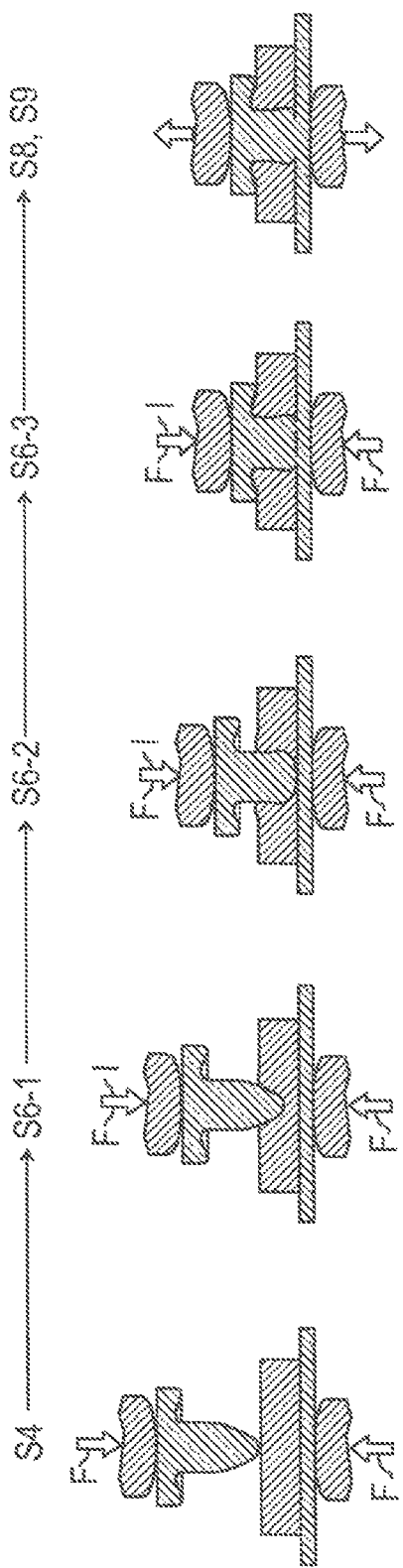
Figure 9:

Some embodiments of the present invention are explained in detail with reference to the accompanying drawings. It shows:

FIG. 1 a perspective sectional view of a preferred embodiment of the setting welding device with a preferred element supply device, FIG. 2 an enlarged view of the punch and the element supply device according to FIG. 1, FIG. 3 an exploded view of a preferred embodiment of the element supply device of FIG. 1, FIG. 4 an exploded view of the preferred clamping jaws forming the blind hole channel, FIG. 5 a partly cross-sectional view of the preferred element supply device according to FIG. 1, FIGS. 6.1 to 6.9 different sequences of the preferred connection method which is realizable with the setting welding device with element supply device, FIG. 7 a depiction of a preferred course of force and a preferred course of current depending on time for a connection method, FIG. 8 a schematic depiction of the preferred electrical and/or mechanical loads during the preferred connection method, and FIG. 9 a flow chart for a preferred embodiment of the connection method.

6. DETAILED DESCRIPTION

FIG. 1 shows a preferred embodiment of a setting welding device 1. This corresponds in its essential structure and functional method to the setting welding device of DE 10 2013 207 284 A1. Further, the setting welding device 1 of FIG. 1 is used for connecting at least one first material layer A and at least one second material layer B by means of a welding auxiliary joining part E under mechanical thermal loads as it is described in DE 10 2013 207 284 A1. Thus, for defining the construction and the functioning of the setting welding device 1 as well as for defining the material layers A, B to be connected to each other and of the welding auxiliary joining part E it is referred to DE 10 2013 207 284 A1.

The setting welding device 1 according to FIG. 1 comprises a counter bearing 5 and a punch 4 arranged oppositely to each other at a known C-frame 3. The punch 4 is moved in joining direction $R_F$ by means of the drive unit 2. Thus, the punch 4 and the counter bearing 5 realize a relative movement with respect to each other along the straight movement line $B_1$. Further, the setting welding device comprises an electric supply unit or a welding module 6 so that electrical loads, for example sufficiently high heating currents or welding currents, can be applied to the material layers A, B to be connected to each other and to the auxiliary welding joining part E by means of the punch 4 and the counter bearing 5. Accordingly, the punch 4 and the counter bearing 5 are constructed preferably as electrode punch and electrode counter bearing by means of which also welding processes can be performed. In other words, the punch 4 and the counter bearing 5 according to a preferred embodiment of the present invention are designed electrically conducting. For being able to better control the wear of the electrode punch 4 and the electrode counter bearing 5 during the welding, the punch 4 and the counter bearing 5 are provided with exchangeable and/or processable welding caps $K_4$ and $K_5$.

An enlarged depiction of the preferred element supply device 10 is shown in FIG. 2. The element supply device 10 comprises an actuator 14 arranged preferably parallel to the joining direction $R_F$ and being longitudinally adjustable. This linearly acting actuator 14 is provided to displace the element supply device 10 or at least a welding auxiliary joining part E supplied therewith and positioned therein with respect to the straight movement line $B_1$. This forms the basis so that a welding auxiliary joining part E preferably being in abutment with the punch 4 is displaceable together with the punch 4 in joining direction $R_F$ (see below). As the drive unit 2 moves the punch 4 and the actuator 14, preferably in an end position with welding auxiliary joining part E, in coordinated manner collectively, the material layers A, B arranged on the counter bearing 5 can be pretensioned thereby specifically mechanically. Further preferred, the element supply device 10 is connected with the punch side of the setting welding device 1 such that the drive unit 2 displaces together with the punch 4 also the element supply 10.

The welding auxiliary joining part E is preferably supplied to the element supply device 10 via a profiled tube 12 or a supply channel by means of pressurized air. From the profiled tube 12, it comes via an arrival path 30 in a closed housing 16 into a blind hole channel 20. The blind hole channel 20 is preferably defined by two scissor-like arranged clamping jaw levers 18, 19. At least one of the clamping jaw levers 18 is arranged fixedly at a bridge 24. The remaining clamping jaw lever 19 is preferably arranged pivotably around an axis and spring pre-tensioned in the direction of the clamping jaw lever 18 by means of a spring 26. Preferably, the clamping jaw levers 18, 19 are formed groove-like at the side facing each other. The groove-like arrangement serves preferably for the form-fit receiving and guiding of the head of the welding auxiliary joining part E. In this way it is ensured that also in an overhead operation of the setting welding device 1 the welding auxiliary joining part cannot fall out of the blind hole channel 20.

At an end of the blind hole channel 20 facing away from the profiled tube 12, a nest-like end position 22 is defined which serves for the receiving and the retaining of a supplied welding auxiliary joining part E. In the portion of the nest-like end position 22, at least one clamping jaw 19 is formed claw-like while the other preferably extends straightly. This shaping ensures that a supplied welding auxiliary joining part E is held first of all in the end position 22. Thus, the blind hole channel 20 is temporally closed on one side. As the clamping jaw 19 is pivotable against the acting spring-force or both clamping jaw levers 18, 19 can be arranged preferably pivotable, the blind hole channel 20 can be opened specifically. Accordingly, the welding auxiliary joining part E is released from the end position 22 thereby.

The element supply device 10 may comprise a further actuator 28. The actuator 28 preferably performs a straight movement perpendicular to the joining direction $R_F$ or to the movement line $B_1$. It is also preferred to provide here an actuator 28 which can pivot or can move in any arbitrary direction. The function to be realized by the actuator 28 is preferably that the welding auxiliary joining part E is positioned below the punch 4, preferably on the movement line $B_1$. This ensures that the welding auxiliary joining part E can be clamped at the counter bearing 5 by the collective moving of the punch 4 and the element supply device 10. As a result, a pre-tensioning of the material layers A, B arranged on the counter bearing 5 is achieved. Further, preferably the clamping holding forces are sufficiently high to remove the clamping jaw levers 18, 19 by means of the actuator 28 from the punch 4 so that the welding auxiliary joining part E is released from the end position 22. While this releasing is ensured solely by means of the actuator 28—thus passively—it is also preferred to open the clamping jaws 18, 19 actively. This could take place by engaging an actuation element or motor-driven (not shown).

The movable clamping jaws 18, 19 are retained in the housing 16. This is preferably closeable by a flap 34. The flap 34 prevents a possible contamination of the end position 22 of the blind hole channel 20 for example by welding splashes or the like.

According to a preferred embodiment of the present invention, the element supply device 10 is arranged at the minus or ground electrode of the setting welding device 1. With reference to the setting welding device 1 of FIG. 1, a negative electrical potential or ground is present at the punch 4 while a positive potential is present at the opposite counter bearing 5. Preferably, the material layer B consisting of weldable material abuts on the counter bearing 5 connected to the positive electrical potential. By means of the electrical polarity of the counter bearing 5 (plus) and the punch 4 (minus), preferably an electrode bombardment with electrons results at this positively loaded counter bearing 5 due to the electron movement "from minus to plus"—thus from punch 4 to counter bearing 5. This electrode bombardment provides a local electron excess at the counter bearing 5 which releases more Joule's heat as it is the case at the negatively poled electrode—thus the punch 4. From this, a temperature super-elevation results at the plus-electrode, thus at the positively loaded counter bearing 5, where the material layer B of weldable material or having a portion of weldable material abuts and a welding lens shall be created.

As an alternative to this, but less effective, it is also preferred to arrange the element supply device at the plus electrode of the setting welding device. With reference to the setting welding device, a positive electrical potential is thus present at the punch.

Further, the element supply device 10 is preferably provided with an individual control. The control or control unit 36 (FIG. 1) captures by means of sensors and/or the information of the actuators 14, 28 the position of the welding auxiliary joining part E in the nest-like end position with respect to the punch 4 and/or the counter bearing 5. Further, the control of the element supply device 10 preferably captures a force by means of which the welding auxiliary joining part E is pressed against the punch 4 or the counter bearing 5 or clamped there. This force is preferably derivable from a motor-current of the actuator 14, if the actuator 14 is provided as step motor. In the same way it is preferred to determine the force by means of a force-sensor of the setting welding device 1.

Further, a rotational angle of a step motor of an actuator 14, 28 is evaluable for determining the absolute advancing distance of the actuator 14, 28. From the captured electrical information of the actuators 14, 28, preferably the control of the element supply device can determine the absolute position and abutment force of the welding auxiliary joining part E for example at the punch 4 or at the counter bearing 5. In reverse, it is preferably also possible for the control to preset an exact position and/or an abutting force of the welding auxiliary joining part E.

According to a preferred embodiment of the present invention, the control of the element supply device 10 is provided as master. Accordingly, the control of the element supply device 10 specifies for the central control of the setting welding device 1 when the welding auxiliary joining part E is positioned suitably and a connection process can start. It is also preferred to integrate the control of the element supply device 10 into the central control to reduce the instrument-based effort. If the element supply device 10 is, however, provided as module, the module-own control is essential for the operation of the element supply device 10 in combination with the setting welding device 1.

Based on the above-described construction, the element supply device 10 is movable independently from the setting welding device 1 or in coordination with the control thereof parallel to the movement line $B_1$, thus in electrode lifting direction. In this way, starting position, partial liftings and different work positions of the element supply device 10 and especially of the welding auxiliary joining part E in the end position 22 are flexibly adjustable and programmable in the control. If one or both welding caps or electrode caps $K_4$, $K_5$ have been milled off or chamfered in known manner after several welding processes for providing a process-secure surface, preferably changed starting positions of the welding auxiliary joining parts E arranged in the end position 22 are corrected and specified by the control of the element supply device 10.

According to a preferred embodiment, it is stored in the control by which absolute amount the starting positions change with a chamfering process of the electrode caps $K_4$, $K_5$. Accordingly, the control uses this information after it has been informed of a completed chamfer process. It is also preferred that the central control of the setting welding device 1 transmits this information to the control of the element supply device 10. According to a further preferred embodiment, it is preferred that the element supply device 10 is moved to the chamfered electrode caps $K_4$, $K_5$ to detect the new starting position or end position of the electrode caps $K_4$, $K_5$.

With respect to FIG. 6, now the connection method with integrated supply of the welding auxiliary joining part E is described. First of all, and according to FIG. 6.1, the welding auxiliary joining part E is supplied to the end position 22 (step S1). For this reason, FIG. 6.1 shows the material layers A, B without a welding auxiliary joining part E arranged above the material layers A, B. The end position 22 of the element supply device 10 is not yet arranged between punch 4 and counter bearing 5.

The actuator 28 now moves the welding auxiliary joining part E below the punch 4 (step S2). The punch 4 forms an electrode in the later welding process, preferably the negative or ground electrode. For this purpose, the flap 34 is opened and the clamping jaw levers 18, 19 move the welding auxiliary joining part E below the punch 4, preferably onto the movement line $B_1$. At the same time, preferably with this movement, the clamping jaw lever 19 is unlocked to be able to release the welding auxiliary joining part E later. Alternatively, but less effective, it is also preferred to connect the punch 4 to the plus electrode and the counter bearing 5 to ground or minus.

In the next step (S3, see FIG. 6.3), the element supply device 10 moves opposite to the joining direction $R_F$ by means of the actuator 14 until the welding auxiliary joining part E abuts with its head at the electrode punch 4. This preferably takes place in a distance-controlled way on fixedly pre-determined distance points. Depending on the chamfer processes at the caps $K_4$, $K_5$ which have been performed prior to this, the distance points are adapted. It is further preferred to achieve the position of the welding auxiliary joining part force-controlled by means of a current threshold in the servo-motoric drive of the actuator 14 of the element supply device 10. A further preferred embodiment is to advance the punch 4 by means of the drive 2 onto the welding auxiliary joining part E positioned on the movement line $B_1$. A sufficient abutment between welding auxiliary joining part E and punch 4 is detectable based on a force sensor in the setting welding device 1 or based on a captured current value of the drive 2 of the setting welding device 1. It is further preferred to use a super-imposed force-/distance-control. This allows additionally a control whether the welding auxiliary joining part E has really been positioned between the punch 4 and the counter bearing 5 and preferably which length it has. Further, it is preferred to realize the above-described steps S2 and S3 by means of a super-imposed horizontal vertical movement of the actuators 14, 28. Accordingly, the welding auxiliary joining part E positioned in the end position 22 could also be moved by means of a curved way into abutment with the punch 4.

FIG. 7 describes the mechanical and electrical loads acting preferably during the connection method. At this, F denotes the force at the punch 4. Above a section of the force-curve (solid line in FIG. 7) and the current-curve (dotted line in FIG. 7), the step S of the connection method is shown respectively. If then in step S3, the welding auxiliary joining part E is displaced against the punch 4, this process is detectable as force-value (see also FIG. 6.3).

After the welding auxiliary joining part E has been positioned at the punch 4, preferably the control of the element supply device 10 as master sends an appropriate signal to the central control (slave) of the setting welding device 1 that the punch 4 shall be displaced together with the abutting welding auxiliary joining part E in joining direction $R_F$. As preferably the element supply device 10 is fastened on the punch side at the setting welding device 1, the element supply device 10 moves together with the punch 4. It is also preferred to extend the actuator 14 together with the displacing movement of the punch 4 and its drive 2.

After receiving the above-mentioned signal in the preferred slave control, the setting welding device 1 moves the punch 4 in the direction of the counter bearing 5 so far until the welding auxiliary joining part E abuts with the side facing away from the head on the uppermost joining partner, thus the material layer A. Further, the displacement path of the punch 4 is limited in that a pre-determined clamping force of the punch 4 is achieved by means of which the welding auxiliary joining part E is pressed onto the material layer A between the punch 4 and the counter bearing 5 (see step S4). The control for achieving this clamping position of the welding auxiliary joining part takes place distance-controlled according to a preferred embodiment or force- and distance-controlled according to a further preferred embodiment. In this way, it can be monitored whether a welding auxiliary joining part E is present, which length the welding auxiliary joining part has, whether the desired material layer A is present and/or the thickness thereof based on the length of the welding auxiliary joining part E. It is certainly also preferred to check only a choice of the above-mentioned parameters. With respect to FIG. 7, it has to be emphasized that the force F in step S4 increases according to the above procedure to realize the respective clamping of the welding auxiliary joining part.

After the clamping of the material layers A, B between the punch 4, the welding auxiliary joining part E and the counter bearing has been achieved and detected, the central control of the setting welding device 1 sends a respective signal to the control of the element supply device 10. It is also preferred that for the purpose of clamping, the tip of the welding auxiliary joining part E is pressed in an embossing manner into the material layer A facing the tip. This stabilizes the clamped welding auxiliary joining part E and thus does preferably not negatively affect the later connection.

Subsequently, in step S5, the element supply device 10 is relieved and the welding auxiliary joining part E is released. For releasing, the clamping jaw levers 18, 19 are opened (see above) or simply removed from the clamped welding auxiliary joining part E (see FIG. 6.5). Accordingly, the force in step S5 is preferably low (see FIG. 7). After the clamping jaw levers 18, 19 have been moved into the housing 16, a new loading of the end position 22 can take place.

After receiving the signal that the welding auxiliary joining part E has reached its clamped starting position, the mechanical drive-in process of the welding auxiliary joining part into the material layer is started by the central control. This step S6-1 is preferably supported by an electrical current flow as can be seen in FIG. 7. The electrical current flow preferably reduces the hardness of the material layer A due to a material heating while the welding auxiliary joining part E is driven to the material layer B.

For cooling the welding auxiliary joining part E and the material layers A, B, preferably time and/or distance-controlled current-free phases are introduced as shown in FIG. 7 (see S6-2). Thereafter, in step S6-3, the welding of the material layer B to the welding auxiliary joining part E takes place. The time of this welding process is preferably determined by a time interval. According to a further preferred embodiment of the present invention, the path of the punch 4 is captured during the welding. If this exceeds a threshold sink value of the welding auxiliary joining part E and thus of the punch 4, the welding process is terminated.

Subsequently, the connection cools down in step S7 without current wherein the joining location is further mechanically braced between punch 4 and counter bearing 5. Subsequently, in step S8-9, the punch 4 and the counter bearing 5 are relieved and the connection is removed as shown in FIGS. 6.8 and 6.9.

As an alternative to the above described embodiment of the welding auxiliary joining part E, the welding auxiliary joining part E' (not shown) has at its head preferably a functional end which protrudes facing away from the shaft of the welding auxiliary joining part E'. The functional end comprises a fastening structure, as for example a threaded web, a threaded sleeve, a ball head or a locking structure, or a design element. The functional end is arranged coaxially to the shaft with respect to the longitudinal axis of the welding auxiliary joining part E'. Preferably, an annular circumferential radial protrusion extends in the transition portion between shaft and functional end. The annular circumferential radial protrusion forms an undercut transverse to the joining direction $R_F$ and assumes the functionality of the head of the above described welding auxiliary joining part E. Preferably, the punch 4' (not shown) comprises in adaption to the welding auxiliary joining part E' a central opening with an annular abutment or pressure face. As soon as the element supply is brought into abutment with the punch 4' in the above described way, the functional end of the welding auxiliary joining part E' is received in the central opening of the punch 4' until the annular abutment face abuts at the annular circumferential radial protrusion of the welding auxiliary joining part E'. If the welding auxiliary joining part E' is joined and/or welded by means of the punch 4', mechanical and/or electrical loads are transmitted via the annular abutment face and the annular circumferential radial protrusion from the punch 4' to the welding auxiliary joining part E' and the components to be connected. The supply of the welding auxiliary joining part E' and the making of a connection take place in the same manner as it has been described above, despite the constructive differences of punch 4' and welding auxiliary joining part E' with functional end.

7. LIST OF CERTAIN EMBODIMENTS FEATURES AND/OR COMBINATIONS OF FEATURES

1. Element supply device of a setting welding device for a bolt-like welding auxiliary joining part having a head and a shaft, in which a relative joining movement along a first straight movement line can be performed by an electrode punch and electrode counter bearing for producing a setting welding connection, wherein the element supply device has the following features:
   a. two scissor-like arranged clamping jaw levers, at least one clamping jaw lever of which is arranged pivotably and both clamping jaw levers form together a blind hole channel which can be closed temporarily on one side having a nest-like end position, in which a welding auxiliary joining part can be received at the end position,
   b. a first actuator by means of which the blind hole channel can be moved along another than the first movement line so that the nest-like end position of the blind hole channel is positionable between the electrode punch and the electrode counter bearing, and
   c. a second actuator by means of which the blind hole channel can be moved parallel to the first movement line in a force- and/or distance-controlled manner so that a welding auxiliary joining part held at the nest-like end position of the blind hole channel can be positioned in a force fit abutting at the electrode punch.

2. Element supply device according to embodiment 1, in which the first actuator comprises a linear actuator by means of which the end position of the blind hole channel can be moved linearly perpendicular to the first movement line.

3. Element supply device according to one of the preceding embodiments, in which the blind hole channel comprises a detent which is pivotable and conquerable by a welding auxiliary joining part only in the direction of the end position.

4. Element supply device according to one of the preceding embodiments, in which the clamping jaw levers of the blind hole channel are formed groove-like at an inner side so that a head of the welding auxiliary joining part can be guided therein and can be held movable therein in a form-fit manner.

5. Element supply device according to one of the preceding embodiments, which comprises a control unit by means of which captured operating data of the element supply device can be evaluated and at least one command for at least one connected component, preferably a central control of a setting welding device, can be created and transmitted thereto.

6. A setting welding device for a welding auxiliary joining part comprising an electrode punch and an electrode counter bearing by means of which a relative joining movement can be performed along a first straight movement line to produce a setting welding connection and which comprises an element supply device according to one of the preceding embodiments.

7. Setting welding device according to embodiment 6, in which the element supply device is fastened at the setting welding device such that it is movable together with the punch during a punch movement.

8. Setting welding device according to embodiment 6 or 7, comprising a central control exchanging data and/or commands preferably as slave component with a control unit of the element supply device configured as master component.

9. Setting welding device according to embodiment 6, 7 or 8, in which the electrode punch is connected to a negative electrical potential and the electrode counter bearing is connected to a positive electrical potential to support a welding process.

10. A connection method in the form of a mechanical thermal setting welding process by means of a bolt-like welding auxiliary joining part for at least one first material layer without pre-punching of the at least one first material layer to at least one second material layer of weldable material or having a section of weldable material, comprising the following steps:
    a. positioning the at least one first and the at least one second material layer between an electrode punch and an electrode counter bearing, which are adapted to perform a relative joining movement along a first straight movement line,
    b. positioning the welding auxiliary joining part between the electrode punch and the electrode counter bearing,
    c. moving the welding auxiliary joining part into abutment with the electrode punch in a force-controlled and/or distance-controlled manner,
    d. subsequently to step c., collectively moving electrode punch and welding auxiliary joining part until abutment at the material layers which are supported at the electrode counter bearing, and thereby mechanical pre-tensioning of the material layers, and
    e. connecting the welding auxiliary joining part and the material layers by means of mechanical and/or thermal loads.

11. Connection method according to embodiment 10, wherein the welding auxiliary joining part is held in force fit, preferably with at least a predetermined force, in abutment at the electrode punch.

12. Connection method according to embodiment 10 or 11, wherein the material layers are pretensioned by the punch and the welding auxiliary joining part without the usage of a down-holder.

13. Connection method according to one of the embodiments 10 to 12, wherein the welding auxiliary joining part is supplied and retained by means of an element supply device, especially the element supply device according to one of the embodiments 1 to 5, during the connection method.

14. Connection method according to embodiment 13, comprising the further step:
    releasing the welding auxiliary joining part by the element supply device after the welding auxiliary joining part and the material layers between the electrode punch and the electrode counter bearing have been pre-tensioned.

15. Connection method according to one of the embodiments 10 to 14, comprising the further step:
    capturing a force applied by the welding auxiliary joining part onto the electrode punch by means of a force-sensor and/or capturing a distance of the welding auxiliary joining part in the direction of the electrode punch covered by means of an element supply device.

16. Connection method according to embodiment 15, comprising the further step:
    transmitting the captured force and/or the captured distance to a control unit and
    starting of an advancing of the welding auxiliary joining part with the electrode punch in the direction of the electrode counter bearing after reaching a predetermined force and/or a predetermined distance.

17. Connection method according to embodiment 16, wherein the captured force and/or the captured distance is transmitted to a control unit of the element supply device and the control unit of the element supply device allows a central control of the setting welding device 1 as a result to continue with the connection method or presets to continue the connection method with a specific step.

18. Connection method according to one of the embodiments 10 to 17, comprising the further step:
    pressing in and welding of the welding auxiliary joining part in the material layers,
    preferably compressing and bracing of the connection of material layers and welding auxiliary joining part by applying a force with the electrode punch, and
    releasing the electrode punch and the electrode counter bearing from the connected material layers.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

LIST OF REFERENCE SIGNS

1 setting welding device
2 drive unit
3 C-frame
4, 4' punch
5 counter bearing
6 electrical supply unit/welding module
10 element supply unit
12 profiled tube
14 actuator
16 housing
18,19 clamping jaw lever
20 blind hole channel
22 nest-like end position
24 bridge
26 web spring
28 actuator
30 arrival path
32 detent
34 flap
$B_1$ first movement line
$R_F$ joining direction
E, E' welding auxiliary joining part
$K_4$, $K_5$ welding caps

The invention claimed is:

1. An element supply device of a setting welding device for a bolt-like welding auxiliary joining part having a head and a shaft, in which a relative joining movement along a first straight movement line can be performed by an electrode punch and electrode counter bearing for producing a setting welding connection, wherein the element supply device has the following features:

a. two scissor-like arranged clamping jaw levers, one clamping jaw lever of which is arranged fixedly and the remaining clamping jaw lever is arranged pivotably around an axis and spring pre-tensioned in the direction of the at least one fixedly arranged clamping jaw lever by a spring and both clamping jaw levers form together a blind hole channel which can be closed temporarily on one side having a nest-like end position, in which a welding auxiliary joining part can be received at an end position, wherein
    b. the two clamping law levers are retained in a closed housing being closeable by a flap that is movable between a closed position in which the clamping law levers are enclosed in the housing and an open position in which the clamping law levers are capable of being moved at least partially out of the housing,
    c. a first actuator by which the blind hole channel can be moved into and out of the closed housing along another than the first movement line so that the nest-like end position of the blind hole channel is positionable between the electrode punch and the electrode counter bearing, wherein the flap is moved to the open position to permit movement of the law levers at least partially out of the housing,
    d. a second actuator by which the blind hole channel can be moved parallel to the first movement line in a force- and/or distance-controlled manner so that a welding auxiliary joining part held at the nest-like end position of the blind hole channel can be positioned in a force fit abutting at the electrode punch, wherein the force fit is achieved by the welding auxiliary joining part being movable into abutment with the electrode punch until a predetermined force is achieved, and
    e. a control unit by which captured operating data of the element supply device can be evaluated and at least one command for at least one connected component can be created and transmitted thereto.

2. The element supply device according to claim 1, in which the first actuator comprises a linear actuator by which the end position of the blind hole channel can be moved linearly perpendicular to the first movement line.

3. The element supply device according to claim 1, in which the blind hole channel comprises a detent which is pivotable and conquerable by a welding auxiliary joining part only in the direction of the end position.

4. The element supply device according to claim 2, in which the blind hole channel comprises a detent which is pivotable and conquerable by a welding auxiliary joining part only in the direction of the end position.

5. The element supply device according to claim 1, in which the clamping jaw levers of the blind hole channel are formed groove-like at an inner side so that a head of the welding auxiliary joining part can be guided therein and can be held movable therein in a form-fit manner.

6. The element supply device according to claim 2, in which the clamping jaw levers of the blind hole channel are formed groove-like at an inner side so that a head of the welding auxiliary joining part can be guided therein and can be held movable therein in a form-fit manner.

7. The element supply device according to claim 3, in which the clamping jaw levers of the blind hole channel are formed groove-like at an inner side so that a head of the welding auxiliary joining part can be guided therein and can be held movable therein in a form-fit manner.

8. The element supply device according to claim 4, in which the clamping jaw levers of the blind hole channel are formed groove-like at an inner side so that a head of the welding auxiliary joining part can be guided therein and can be held movable therein in a form-fit manner.

9. A setting welding device for a welding auxiliary joining part comprising an electrode punch and an electrode counter bearing by which a relative joining movement can be performed along a first straight movement line to produce a setting welding connection and which comprises the element supply device according to claim 1.

10. The setting welding device according to claim 9, in which the element supply device is fastened at the setting welding device such that it is movable together with the punch during a punch movement.

11. The setting welding device according to claim 9, comprising a central control exchanging data and/or commands as slave component with the control unit of the element supply device configured as master component.

12. The setting welding device according to claim 10, comprising a central control exchanging data and/or commands as slave component with the control unit of the element supply device configured as master component.

13. The setting welding device according to claim 9, in which the electrode punch is connected to a negative electrical potential and the electrode counter bearing is connected to a positive electrical potential to support a welding process.

14. The setting welding device according to claim 10, in which the electrode punch is connected to a negative electrical potential and the electrode counter bearing is connected to a positive electrical potential to support a welding process.

15. The setting welding device according to claim 11, in which the electrode punch is connected to a negative electrical potential and the electrode counter bearing is connected to a positive electrical potential to support a welding process.

* * * * *